(12) United States Patent
Ranka et al.

(10) Patent No.: US 7,130,808 B1
(45) Date of Patent: Oct. 31, 2006

(54) METHOD, ALGORITHM, AND COMPUTER PROGRAM FOR OPTIMIZING THE PERFORMANCE OF MESSAGES INCLUDING ADVERTISEMENTS IN AN INTERACTIVE MEASURABLE MEDIUM

(75) Inventors: Sanjay Ranka, Cupertino, CA (US); Jason S. Lenderman, San Diego, CA (US); James Weisinger, Belmont, CA (US)

(73) Assignee: The Product Engine, Inc., Saratoga, CA (US)

( * ) Notice: Subject to any disclaimer, the term of this patent is extended or adjusted under 35 U.S.C. 154(b) by 1150 days.

(21) Appl. No.: 09/586,387

(22) Filed: Jun. 2, 2000

Related U.S. Application Data (60) Provisional application No. 60/173,689, filed on Dec. 29, 1999.

(51) Int. Cl.
*G06F 17/00* (2006.01)
(52) U.S. Cl. .......................................... 705/10; 705/12
(58) Field of Classification Search .................. 705/10, 705/14, 27, 11, 12
See application file for complete search history.

(56) References Cited

U.S. PATENT DOCUMENTS

| | | | | |
|---|---|---|---|---|
| 5,371,673 A | * | 12/1994 | Fan ................................. | 704/1 |
| 5,727,129 A | | 3/1998 | Barrett et al. .................. | 395/12 |
| 5,809,481 A | | 9/1998 | Baron et al. ................... | 705/14 |
| 5,848,397 A | | 12/1998 | Marsh et al. .................. | 705/14 |
| 5,873,068 A | | 2/1999 | Beaumont et al. ............. | 705/14 |
| 5,884,305 A | | 3/1999 | Kleinberg et al. ............. | 707/6 |
| 5,937,037 A | | 8/1999 | Kamel et al. ............. | 379/88.19 |
| 5,937,392 A | | 8/1999 | Alberts ........................ | 705/14 |
| 6,128,651 A | | 10/2000 | Cezar ........................ | 709/217 |
| 6,161,127 A | | 12/2000 | Cezar et al. ................. | 709/203 |
| 6,182,059 B1 | | 1/2001 | Angotti et al. | |
| 2003/0195837 A1 | * | 10/2003 | Kostic et al. .................. | 705/37 |
| 2005/0039206 A1 | * | 2/2005 | Opdycke ...................... | 725/35 |

FOREIGN PATENT DOCUMENTS

JP    2004295379    * 10/2004

* cited by examiner

*Primary Examiner*—Pierre E. Elisca
(74) *Attorney, Agent, or Firm*—David H. Judson (57) ABSTRACT

Method, procedure, algorithm, system, and computer program for improving and attempting to optimize the performance of messaging campaigns, particularly to marketing campaigns in which advertisements or other messages are distributed over an interactive measurable medium such as the Internet. A goal is to allocate the message alternatives to the customer population to optimize business objectives. The includes reading prior stage message state data pertaining to a prior stage including a cumulative number of trials and a cumulative number of successes for a particular message. Message performance results representing message trials and message successes from the previous stage based on the prior-stage state are then read, and a current message state is computed. A current message allocation is generated based on the current message state. Desirably the cumulative number of trials and the cumulative number of successes are discounted based on the age of the information. This inventive procedure may be applied to various message types including, for example, web site banner advertisements, electronic advertisements generally, email messages and promotions, and the like. In one embodiment, the messages are internet web site banner ads, trials are impressions of the ads presented to the user, and successes are measured by clickthroughs from the banner ad to the web site associated with the banner ad. Computer system, computer program, and computer program product associated with the inventive method and procedures are also provided by the invention.

80 Claims, 2 Drawing Sheets

METHOD, ALGORITHM, AND COMPUTER PROGRAM FOR OPTIMIZING THE PERFORMANCE OF MESSAGES INCLUDING ADVERTISEMENTS IN AN INTERACTIVE MEASURABLE MEDIUM

U.S. patent application Ser. No. 09/586,393, filed Jun. 2, 2000 and entitled System, Method, and Business Operating Model for Optimizing The Performance of Advertisements and Other Messages In An Interactive Measurable Medium; U.S. patent application Ser. No. 09/586,394, filed Jun. 2, 2000 and entitled System and Method for Optimizing the Performance of Email and Other Message Campaigns; and U.S. patent application Ser. No. 60/173,689 filed Dec. 29, 1999 and entitled Optimizing the Performance of Emails, are related application each of which is hereby incorporated by reference.

FIELD OF THE INVENTION

This invention relates generally to methods, algorithms, and computer software programs for optimizing the performance of advertisements and other messages or content, and more particularly to methods, algorithms, and computer software programs for optimizing the performance of advertisements, messages, and other content in an interactive measurable medium such as a global network of interconnected information devices and appliances, and most particularly to optimization of performance of banner ads presented on internet web sites.

BACKGROUND

This invention relates to method, procedure, algorithm, system, and computer program for improving and attempting to optimize the performance of marketing campaigns in which advertisements or other messages are distributed over an interactive measurable medium such as the Internet. When the message is an advertisement, the campaign involves a list of ad alternatives and a target customer population. The goal of the marketer is to allocate the ad alternatives to the customer population to optimize business objectives such as maximizing the number of responses received. When the message is other than an advertisement, the goal is to otherwise allocate messages to optimize analogous business or campaign objectives, typically measured by the number of successes or successful responses. In this description, the term "ad" has the same meaning and is used interchangeably with the term "advertisement".

In large part due to the particular applicability of the invention to advertisements on the Internet, this background description focuses on internet advertising to establish one context of the invention and to differentiate the invention from conventional systems and methods. It is to be understood however, that the invention is not to be interpreted to be limited only to an Internet advertising environment.

Various systems currently exist for the delivery and tracking of advertisements on the internet, for instance, ad servers for serving and tracking "banner ads" on a web page. The users of these ad delivery or ad server systems have access to data on the performance of all the ads on all the locations. This data is updated by the delivery and tracking system on a periodic basis. The users are also provided with an array of parameters to configure the delivery and tracking system. In a typical conventional situation, an advertiser buys advertising space (ad space) on a number of web sites. The advertising space buy on each web site consists of a number of categories. Such categories may correspond to different sections within that web site, where a section is a specific web page or a set of related web pages within the site. A category may also correspond to keywords searched by a customer on a search engine. The term "zone" will be used to represent a unique site and category combination. There may typically be a number of banners that an advertiser wishes to deploy across these zones. A banner is either a graphic image that announces the name or identity of a site or is an advertising image. An impression occurs when an Internet visitor sees a banner. A clickthrough occurs when a visitor to a zone clicks on a banner. This redirects the visitor to the page on the advertiser's web site.

The term "placement" is used to refer to a particular banner-zone combination. The fraction of impressions (relative to the total number of impressions associated with the particular zone) that should be allocated to a particular banner alternative is an important placement parameter that the advertiser can select and modify, to boost the advertising campaign performance.

Impressions can occur at any time—whenever someone visits the appropriate page of a web site. However, the reports are typically updated at discrete times. We will call the intermediate time between two reports a stage. At the end of each stage, the results are available for that stage. In particular, the following information is available for each placement: (1) the number of impressions delivered during a stage, and (2) the number of clickthroughs generated during a stage.

Additionally this information (that is, the number of impressions delivered during a stage, and number of clickthroughs generated during a stage) may be available separately for: (a) different time slots within a stage (e.g. hour of day, if each stage is a day); (b) different frequency levels i.e. the number of times that an ad was seen by the customer; (c) different operating systems used by the machine on which the customer is logged on; (d) different internet browsers used by the customer; and (e) different domain addresses of the computer on which the customer is logged on. This list is exemplary and not intended to be exhaustive.

In conventional systems and methods, these reports are provided in printed form or in the electronic equivalent of printed form, and are manually analyzed by trained analysis personnel to derive new, improved advertisement configurations. For example, they are analyzed in an attempt to optimize the clickthroughs generated by a pool of banner alternatives for a given zone, a given frequency level, and the like configuration information. This manual process is tedious and error-prone and has an inherent delay between the period of data collection and the time new advertisements are to be placed because of the large amount of data to be analyzed and the large number of parameters to be modified. Even if errors are not made and the user is able to overcome the tedium of the process, it is unlikely to yield optimal or even near-optimal recommendations for advertisement configurations. This is especially true in light of the typical delay of from a day to a week that elapses between data collection, analysis, and a new or modified ad campaign based on the analysis.

Optimization to provide an effective advertising campaign is in essence a multi-dimensional optimization problem, that by-and-large cannot be timely solved using conventional tools, methods, or systems. It is noted that these problems exist substantially independent of the type of advertisement or message, and that such issues and problems exist relative to advertisements for products and services, political campaigns, ballot measures and initiatives, media programming, lobbying, surveys, polling, news headlines, sports scores, as well as other directed marketing, promotions, surveys, news, information, other content generally, and the like.

Therefore, there remains a need for an automated system for optimizing allocation parameters for advertisement alternatives or message alternatives. There also remains a need for an automated system and method for rapidly and efficiently executing the optimized allocation parameters to place the advertisement or message on the Internet or other local or global communication system. More particularly there remains a need for an optimization procedure or algorithm that utilizes available message performance information (for example, ad performance information) and generates recommendations for maintaining good performance or for improving performance during a subsequent stage of the campaign or optimizing performance of the entire campaign.

There also remains a need for a system and method that can learn and optimize across the various other parameters that can be reconfigured in advertisement delivery systems also commonly referred to as ad servers. For example, there remains a need for an ad server system and method that permits an advertiser to display different banners (or other content or messages) based on a time-of-day user web browsing profile which may include geographic location information, demographic information, or the like, as well as other user targeting information.

There also remains a need for an operating model that provides the optimized allocations for banner ad alternatives or message alternatives automatically on an interconnected network of computers or other information devices or appliances without significant human intervention.

These and other needs in conventional systems and methods are solved by the inventive system and method, particularly by the inventive optimization method and algorithm and computer software implementations of the inventive optimization algorithm and method.

SUMMARY

The invention provides method, procedure, algorithm, system, and computer program for improving and attempting to optimize the performance of messaging campaigns, particularly to marketing campaigns in which advertisements or other messages are distributed over an interactive measurable medium such as the Internet. When the message is an advertisement, the campaign involves a list of ad alternatives and a target customer population. The goal of the message manager or marketing manager is to allocate the ad alternatives to the customer population to optimize business objectives such as maximizing the number of positive responses received. When the message is other than an advertisement, the goal is to otherwise allocate messages to optimize analogous business or campaign objectives, typically measured by the number of successes or successful responses.

An optimization procedure is implemented on a computer that is programmed to retrieve message performance information and to generate recommended message allocations for a next stage in a multistage messaging campaign to achieve messaging goals. In one aspect the invention provides a method for improving the stage-to-stage performance of a message in a multi-stage message campaign in an interactive measurable medium. The interactive measurable medium may for example, be the Internet or other distributed set of interconnected computer or information appliances. The measurable quality of this medium lies in part on its ability to measure responses to messages of different types. The method includes reading the prior stage message state pertaining to a prior stage in a message campaign, where the prior stage message state includes a cumulative number of trials and a cumulative number of successes for a particular message at the end of the prior stage. The message performance results representing message trials and message successes from the previous stage based on the prior stage state are then read; and a current (or new) message state is computed on the basis of the prior stage message state and the message performance results. Finally, a current (or new or updated) message allocation is generated based on the current message state. Normally, the newly determined current message state is stored as prior stage state for a next iteration of the procedure. Desirably, but optionally, the cumulative number of trials and the cumulative number of successes include discounted cumulative number of trials and discounted cumulative number of successes; and generating a current message allocation includes applying a message allocation constraint. This inventive procedure may be applied to various messages including for example, web site banner advertisements, electronic advertisements generally, email messages and promotions, and the like. In one embodiment, the messages are internet web site banner ads, trials are impressions of the ads presented to the user, and successes are measured by clickthroughs from the banner ad to the web site associated with the banner ad.

Computer system, computer program, and computer program product associated with the inventive method and procedures are also provided by the invention.

DETAILED DESCRIPTION OF EMBODIMENTS OF THE INVENTION

The invention provides system, apparatus, method, computer program, and computer program product for monitoring and improving the performance of messages communicated over an interactive measurable medium, such as the Internet. The term optimizing is used to describe the attempt to improve performance though those workers having ordinary skill in the art will appreciate that while there may be only a single "optimum" which may not always be attained, there are many degrees of performance improvement that may be obtained. As used in this description, optimization conveniently means improvement rather than requiring attainment of any single optimum value. Put differently, optimization refers to procedures, algorithms, and other attempts to attain optimum performance rather than requiring that the optimum performance be attained.

Sectional headers provided in this description are provided merely for the purpose of assisting the reader in understanding where a primary description of a particular aspect of the invention is described. It is understood that aspects of the invention are described throughout the description, drawings, and claims and that the headers do not limit the description in any way.

The messages that are being optimized may be any type of message or communication and include by way of example but not limitation messages such as advertisements including web site banner ads, marketing campaigns, political campaigns, surveys, sales and promotions of various types, public service announcements, electronic mail or email, pop-up windows and the like. Usually, there will be several message alternatives.

In simplified terms, one embodiment of the invention provides an optimization system and procedure that selects (or selects more frequently) and utilizes one or more well performing message alternatives and deselects (or selects less frequently) poorer performing message alternatives from among the available message alternatives based on the past performance of at least some of the other message alternatives. However, recognizing that a particular message alternative's performance may change (improve or degrade) over time, in at least some embodiments of the invention, even poorer performing message alternatives may be allocated some share of the total number of messages to be sent. The inventive system and method are adaptive and learn continuously. In some embodiments, newer performance information is weighted more heavily than older performance information, and the manner in which this weighting function is applied is selectable and programmable as are many other aspects of the inventive procedure.

Among the many features that distinguish the inventive system and method from conventional ones, the invention provides a procedure that recommends and allocates messages to and among a plurality of different message alternatives at intervals of time. These intervals of time are referred to here as "stages" and though they may be any arbitrary intervals of time, the stages are desirably regular intervals of time. For example stages may be 6-hour intervals, 12-hour time intervals, one per day, one per week, or any other interval. Usually, the intervals should be long enough to allow collection of significant performance data, and not so long that important short-term trends may be missed. In developing this recommendation and allocation, one embodiment of the inventive procedure uses the available performance or response data from all prior stages in the message campaign. In another embodiment, the performance or response data from prior stages may be discarded after a predetermined number of stages have passed or the performance or response data may be weighted to increase the contribution for recent data and discount the contribution for older data. In either case, the inventive procedure tries to maximize performance, which may be indicated by the total number of positive responses generated by the message set.

To achieve these benefits, the inventive procedure spreads messages to all or most of the message alternatives, in the earlier stages, to discover high performing alternatives. As more information is available about the performance of these message alternatives, a higher concentration of messages are sent to better performing message alternatives, where better performing describes relative performance between the message alternatives sent. The inventive procedure can also robustly handle reasonable fluctuations in the underlying performance of a message alternative without deteriorating performance significantly. This later characteristic is beneficial because performance of a message alternative may change over time due to seasonal fluctuations or other reasons. Empirical and heuristic evidence, including computer simulation, have demonstrated the effectiveness of the inventive procedure in improving performance over that achieved by simplistic allocation strategies. Some of these simplistic allocation strategies include, for example distributing the messages uniformly over all the different message alternatives or assigning most of the messages to the best performing message alternative up to that stage.

While the inventive system and method may be applied to various message types, the description below for purposes of illustration focuses on advertising messages, and web site banner ads in particular. The general principles, algorithms and procedures, and parameters described relative to banner ads (or banner ads) apply as well to messages of other types in interactive measurable digital environments.

A marketing or ad campaign involves a list of ad alternatives (a particular type of message alternative) and a target customer population. The goal of the marketer is to allocate the ad alternatives to the customer population to optimize business objectives such as maximizing the number of responses received. In an embodiment of the invention directed to advertising, the invention provides procedure and algorithm for optimizing the performance of marketing campaigns in which advertisements are distributed over an interactive, measurable medium such as the Internet. One particular type of ad that is a very popular type of advertisement is the internet web site banner ad.

A banner ad, or more simply "banner," is an on-line ad the advertiser wants displayed at one or more zones. An advertiser buys ad space (advertising space) on at least one, but usually on a number of web sites for the banner. The ad buy on each site consists of a number of zones, where the zones may for example be different sections or locations within that site, or more generally locations anywhere on the entire network. We will use the term "zone" to specify a location at which a banner ad or other message can be displayed on a given page of a give Internet site. During a banner ad campaign, the advertiser pays to have banners shown at one or a collection of zones.

There are likely to be a number of banner ad alternatives that the advertiser wishes to deploy across these zones. For a given campaign, a marketer will provide a collection of banners that need to be assigned to the available impressions. The term "impression" is commonly used in the industry to refer to the occurrence of a banner ad on a Internet web site. A "click-through" occurs when a visitor to a zone clicks on a banner. Clicking-through a banner ad redirects the visitor to the page on the advertisers web site. Impressions occur when a user visits the appropriate page of a site where the banner is displayed. The term "message alternative" is used more generically for other message types, where a particular "message" is selected from available message alternatives. In an analogous manner, an "email" is selected from available "email alternatives," a "pop-up window alternative" is selected from available "pop-up window alternatives," a "web page" is selected from available "web page alternatives," and a "web layout" is selected from available "web layout alternatives." Using this syntax, a "banner" is selected from "banner alternatives." The phrases "message impression," "email impression", and "web page impression" though being analogous to "banner impression" have not been adopted in the field, rather the terms "email", "message", and "web page" themselves correspond to the impression.

Reports providing information as to the performance of such banner ads are generated or updated at discrete times. The intermediate time between two reports is referred to as a stage. At the end of each stage, the ad performance results are available for that stage. In particular, ad performance indicators such as the number of impressions delivered and the number of clickthroughs are available for each banner at each zone.

The invention provides an automated system for optimizing ad allocation parameters and executing them on the Internet or other communication system or media. The invention can also be used to optimize across the various other parameters that can be selected and configured in ad delivery systems. For example, ad delivery systems may typically allow an advertiser to display different banners based on the time of the day, the profile of the user browsing the web site (for example, their geographic location and other demographic information), as well as other ad or marketing targeting criteria.

A marketing manager or other person responsible for directing the ad campaign may typically impose certain constraints on where or when certain banners may be displayed. For example, a given banner might be excluded from appearing at a specific zone during certain stages of the ad campaign. This type of constraint may reflect the fact that an advertiser's buy for one zone covers different stages than the buy at another zone. Or, a particular banner may just not be appropriate for some zones. These are merely illustrative of the constraints that may be imposed and it will be clear to those workers having ordinary skill in the art that virtually any parameter or condition associated with placing ads may be constrained by the marketing manager or other responsible person. In the context of the inventive structure and method, the ability to constrain one or more ad campaign allocation parameters, conditions, or other attributes is desirable so that any constraints that might not normally be constrained by the optimization procedure are understood to be constrained and taken into account.

One embodiment of the inventive optimization method may be utilized in conjunction with a system and method for optimizing the performance of messages, embodiments of that are described in U.S. patent application Ser. No. 09/586,393, filed Jun. 2, 2000 and entitled System, Method, and Business Operating Model for Optimizing The Performance of Advertisements and Other Messages In An Interactive Measurable Medium, which is hereby incorporated by reference. The inventive optimization method and algorithm may also be utilized in conjunction with a system and method for improving the performance of electronic mail and electronic mail systems, embodiments of which are described in U.S. patent application Ser. No. 09/586,394, filed Jun. 2, 2000 and entitled System and Method for Optimizing The Performance of Email and Other Message Campaigns, which is hereby incorporated by reference. However, those workers having ordinary skill in the art in light of the description provided here will appreciate that the invention is not limited to these particular exemplary applications.

The invention can learn and optimize across the various other parameters that are available for configuring message or ad server systems. For instance, ad server systems permit display of different banner ads based on the time of the day the profile of the user browsing the web site (e.g. their geographic location and other demographic information), as well as other targeting criteria. The inventive optimizing system and method learn and then set the appropriate parameters across multiple content and placement dimensions so as to optimize the objective specified by the message provider, such as an advertiser.

Those workers having ordinary skill in the art in light of the description provided here will appreciate that the system as described above can be easily extended to be useful for optimizing other message types, including, for example: (1) email alternatives, (2) pop-up window alternatives, (3) web page alternatives, and (4) web layout alternatives.

In one aspect, the invention provides a system for optimizing ads or other messages in an interactive measurable medium and automating the configuration of an ad server system in a larger interactive medium, such as the internet. The system includes an optimizing engine typically within a server of conventional type having a processor, a memory coupled to the processor, and a local data storage, along with input/output and other network communication devices for communicating data and commands to other computers or information appliances. The optimization engine that implements the inventive optimization procedure in software takes as input an ad performance report or other performance data and generates configuration parameters for the optimal placement and targeting of ads. In one embodiment, it loads the performance reports from a database and stores the parameter values into the database. The database stores user-configured information, optimization engine generated configuration and the performance reports from the ad server system. An advertising server interaction service is operative to load performance reports from the ad server system and store them in the database as well as taking user or optimization engine generated settings and setting them into the ad server system. In the system implementation, the user interface allows the user to enter campaign data and specifications about the optimization. Additional features of such a system are described in U.S. patent application Ser. No. 09/685,393, filed Jun. 2, 2000 and entitled System, Method, and Business Operating Model for Optimizing The Performance of Advertisements and Other Messages In An Interactive Measurable Medium.

As the inventive method is advantageously implemented as a computer program on a general purpose computer, such as for example a computer operating in an Internet or other network server environment, attention is now directed to an exemplary computer system which may be used in conjunction with the inventive method, procedure, computer program, and computer program product.

Figure 1:
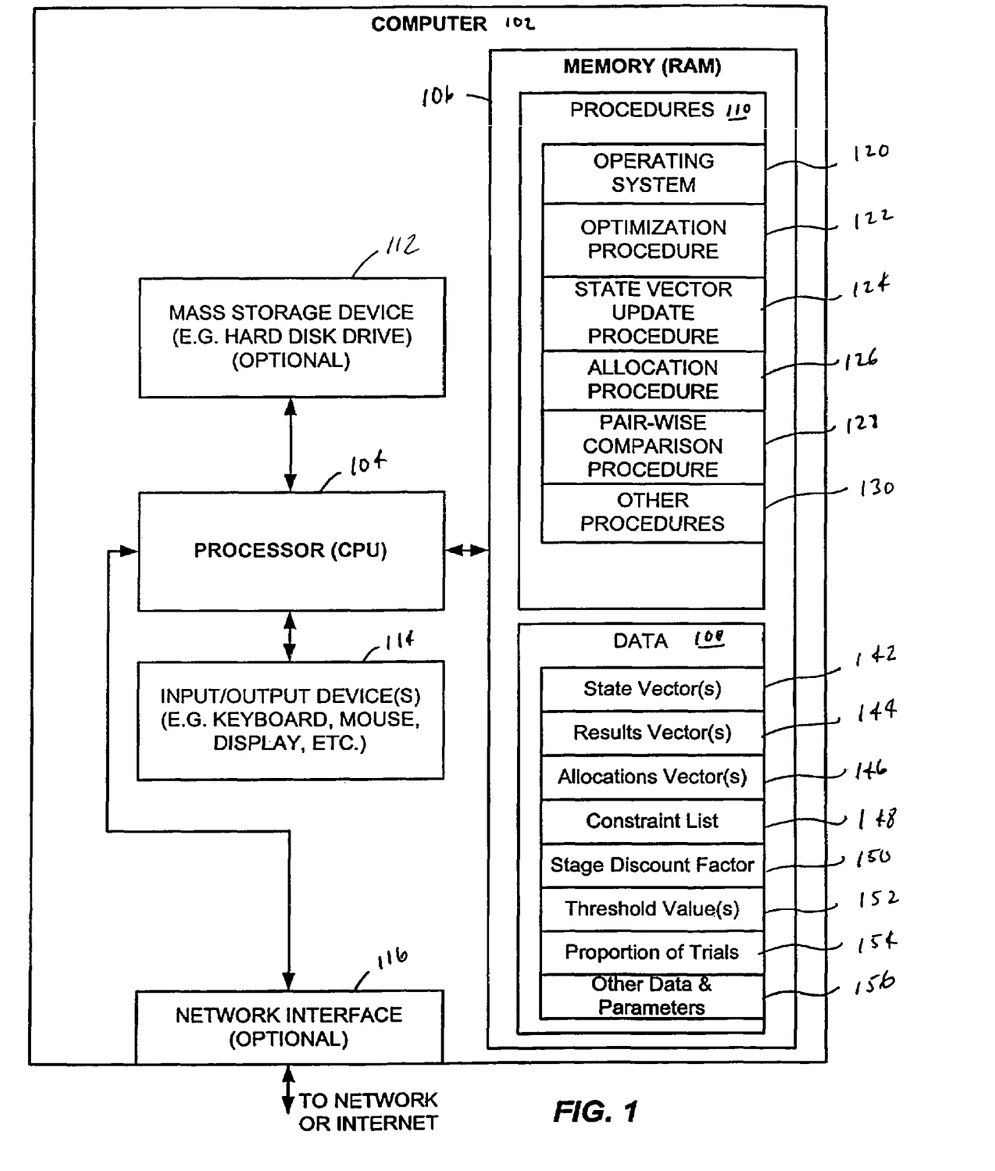
FIG. 1 is an illustration showing a system according to an embodiment of the invention with which the inventive method and computer program may be used.

With respect to FIG. 1, computer 102 includes a processor or CPU 104 coupled to a fast random access memory 106 storing data 108 and procedures 110. Processor 104 is also conveniently coupled to one or more mass storage device 112 such as one or more hard disk drives of which many types are known, The mass storage devices may typically store information in one or more databases. In the context of the present invention, such databases may store performance data, allocation data, and other data and/or procedures or algorithms that are not currently being processed by the processor 104 or memory 106. Input/output devices 114 may also be conveniently coupled to the processor or other computer system 102 components for inputting data to the computer, retrieving results from the computer, monitoring activity on the computer or on other network devices coupled to the computer, or other operations as are known in the art. A network interface 116, such as a network interface card (NIC), modem, or the like is also conveniently provided.

Procedures 110 may for example, include an operating system 120, an optimization procedure 122, a state vector update procedure 124, a message allocation procedure 126, a pair-wise or other message alternative comparison procedure 128, as well as other procedures and algorithms 130.

Data 108 may for example include one or more state vector 142, results vector 144, allocations vector 146, constraints list or constraints items 148, stage discount factors or parameters 150, threshold values 152, proportional of impressions or trials factors 154, or other data or parameters 156.

Those workers having ordinary skill in the art in light of the description provided here will appreciate that the computer system 102 described here is merely exemplary and that various modifications may be made, or that other computer system architectures may be used in conjunction with the inventive system, method, and computer program.

Optimization Procedure and Algorithm

Having described certain high level features of the inventive optimization procedure as well as providing an exemplary environment in which the inventive procedure has particular applicability, attention is now directed to details of a particular embodiment of the inventive algorithm or procedure.

This embodiment is described in the internet banner ad context. In this application context, three principal types of data are used by the inventive procedure: (i) State Vector, (ii) Results Vector, and (iii) Allocations Vector which includes a Constraints List. (In one embodiment, the Constraints List is separate from the Allocation Vector, but used to generate the Allocation Vector.) These data types are described in turn. The term vector is used to refer to one form in which the data is stored and/or manipulated.

Zone/Banner States and State Vector

For each combination of a zone and a banner, the inventive procedure retains a "state vector" that records all of the information that has been collected on the given banner at the given zone (zone/banner combination). This state vector is updated at the end of each stage of the campaign to reflect the results of that stage. In particular, the state vector contains the history of impressions and clickthroughs for the given zone and banner.

Results Vector

The results vector is a vector of the results of the most recent stage of the campaign. It contains the unprocessed impression and clickthrough data for each zone/banner combination. If a banner was not displayed at some zone during the most recent stage, the results vector indicates this fact.

Allocations Vector

The allocations vector contains the recommended allocation of banners to impressions for the next stage of the campaign. Intuitively, these allocations are expressed in percentage terms. However, in practice the recommended allocations may be re-expressed in a form acceptable to the ad server. Hence, some translation or transformation may be provided. The Allocations Vector may also include a list of constraints, though the constraints list may be separately provided.

A list of any constraints on the allocation of banners to impressions is stored in the constraints list. At least two types of constraints can occur. First, the user can specify the minimum number of banners that must be retained and displayed at each stage of the ad campaign. Second, the inventive procedure implemented as a computer program on a general-purpose computer retains a table of "banner exclusions." The table of exclusions, includes for example, a table defined as a data structure in memory that indicates when a given banner should not be shown on a given zone. This table may include one or more entries or may be empty.

The inventive procedure is advantageously run at the end of each stage of an ad campaign. It allocates the available banner impressions or banner ad alternatives at each zone for the next stage among the available banners. That is, it generates a strategy or recommendation for displaying banners during the next stage of the campaign. In developing this recommendation, the algorithm uses the results from all prior stages. (Though in at least one embodiment, a selected range of data from older stages may optionally be discarded, and in a different embodiment, not all data from all stages has the same weight or value in the recommendation.) One objective is to allocate the banners at all stages so that the total number of positive results, such as user clickthroughs on a web site, recorded at all zones by all banners during the campaign is maximized. Other operations may optionally be performed, for example, during the ad campaign, the client advertiser or marketing manager may wish to delete or add a zone or banner.

Figure 2:
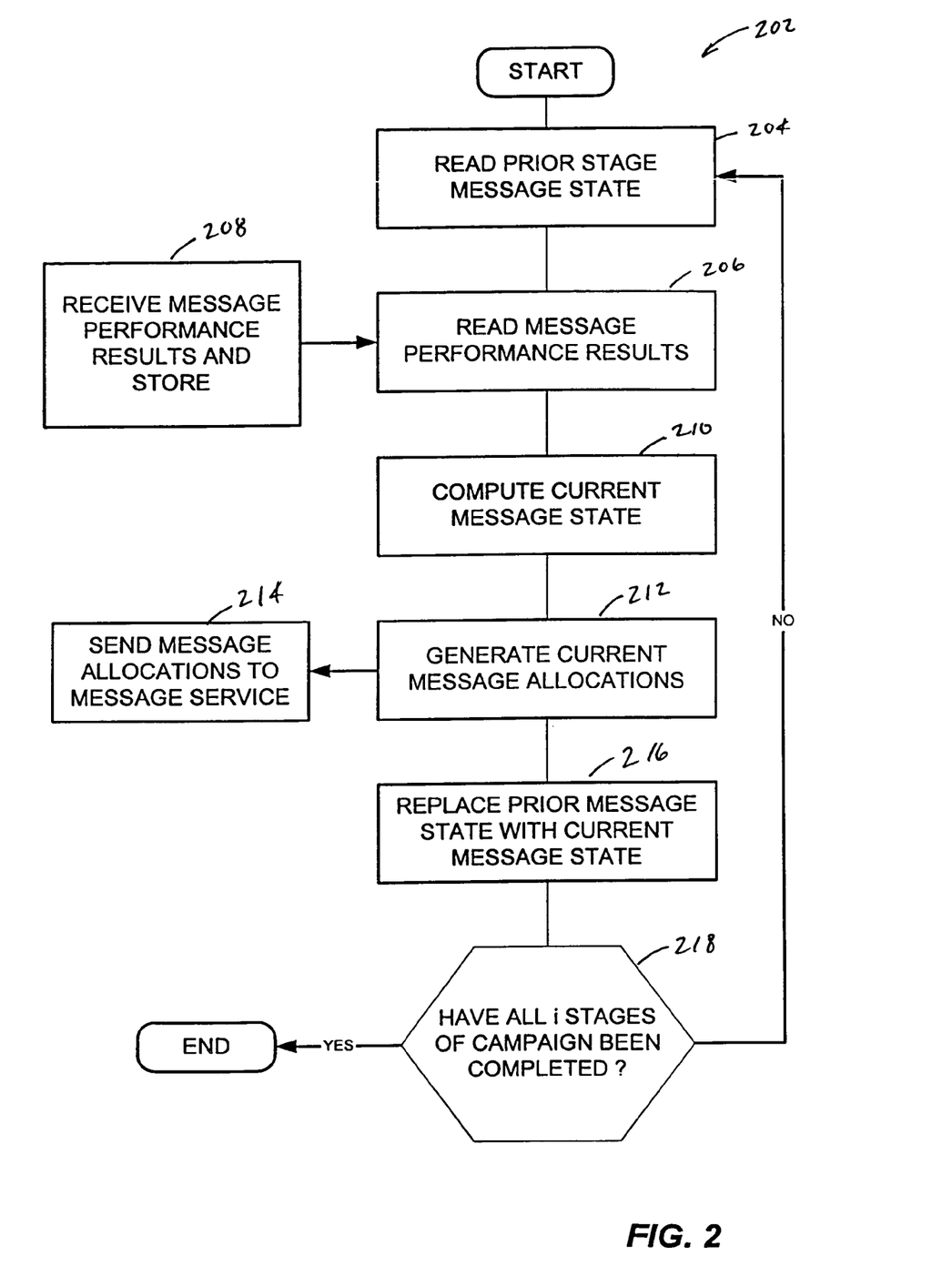
FIG. 2 is a diagrammatic illustration showing a flow chart of an embodiment of the inventive optimization procedure.

An embodiment of the optimization procedure 202 is now described relative to the flow-chart diagram of FIG. 2. First, the prior stage message state is read (Step 204). Next, message performance results are read (Step 206). These performance data or results are typically received from another source, such as an ad service and stored (Step 208). The current (or new) message state is then computed (Step 210) using, for example, the state vector procedure described in greater detail elsewhere herein. Message allocations, possibly with some format transformation to adapt them to the particular format needs of a receiver, are generated (Step 212) and sent to the receiver such as a message service (Step 214). As a primary application of the inventive method is for Internet advertising, the message service will frequently be an ad service. As the message campaign (ad campaign) is generally a multi-stage campaign, the procedure is repeated until all stages in the campaign have been completed. This requires that the prior message state used in step 204 be replaced with the current message step (Step 216) generated in step 210 before the next iteration (Step 218). New message performance results received in step 206 are also used for the next iteration.

While it is generally intended that performance data or results are received for each prior stage before allocations are generated for the current or next stage in the campaign, and the inventive procedure benefits from such timely receipt, the invention does not require such timely receipt. In the event that expected prior stage results are not for some reason received as expected, the inventive procedures are sufficiently robust that the new allocations are merely based on the previous performance data or results. Therefore, when new performance results are not available, the old performance results are read or otherwise used in the computations. In some instances this may result in the same or substantially the same allocations as the previous stage, however, where discounting is applied, the allocations may not be the same. The extent of the difference may typically depend upon the discounting function and the historical prior performance results to which the discounting is applied.

Each of these operations is now described in greater detail. For purposes of clarity of description, it is assumed that the procedure is applied relative to a single zone. If multiple zones are available, the procedure is applied to each of the multiple zones one-at-a-time to derive the allocations for that zone. The banner ad performance may improve or deteriorate over time so that generally the performance of an ad is non-stationary in a statistical sense. There are a number of potential reasons for a banner to have non-stationary behavior in the underlying performance. For example, a banner that promises overnight delivery may be quite effective shortly before Christmas, but much less effective on the day after Christmas. Even absent a particular identifiable event, the performance of ads may change over time. For example, Internet visitors may see a given banner too many times and beyond some point the banner loses all attraction. As the fraction of visitors who have seen the ad too many times increases the performance of the banner deteriorates.

State Vector Update Procedure

One embodiment of the inventive procedure optionally but advantageously uses a "discounting" of the performance data in computing or updating the State Vector. Such discounting may be in the form of a binary step function where data older than a certain stage is simply ignored, in the form of a linear or non-linear weighting function, or according to any other weighting or discounting scheme. In one embodiment, the discount is in the form of a geometrical discounting, that is, at the end of each stage all data (such as for example, the number of impressions and number of clickthroughs) is multiplied by a one-stage discount factor beta, β, where beta is a number less than one (β<1). Thus, data that is n stages old at the time when the procedure is executed will end up being multiplied by beta raised to the n power ($\beta^n$). In this manner newer performance data is weighted more highly than older performance data. While not true in all circumstances, it is generally true that newer performance data provides better guidance as to what allocation scheme will be successful in the next stage than will older performance data. In any particular situation where this generalization does not hold true, different discounting schemes, including for example a discounting scheme that weights some segment of performance data more heavily than newer performance data, may be applied. If no discounting is desired, beta may be set to 1 (β=1). (Empirical and simulation studies have shown that a value of the one-stage discount factor (beta) of about 0.9 works well for a range of synthetic and real data sets, though values between about 0 and about 1 may be used, more typically between about 0.5 and 0.99, more usually between about 0.8 and about 1.0, and even more usually between about 0.85 and 0.95 may be used.)

Let $s_i(t)$ denote the total number of discounted cumulative clicks and $n_i(t)$ denote the discounted cumulative number of impressions for banner i at the end of stage t. Let $imp_i(t)$ denote the total number of impressions and $click_i(t)$ represent the total number of clicks and impressions for a particular banner i in stage t. Then the discounted cumulative clicks $s_i(t)$ and the discounted cumulative impressions $n_i(t)$ are given by the following expressions:

$$s_i(t)=\beta s_i(t-1)+click_i(t-1), \text{ for } t\geq 2; \text{ and}$$

$$n_i(t)=\beta n_i(t-1)+imp_i(t-1), \text{ for } t\geq 2;$$

where $s_i(1)=0$ and $n_i(1)=0$. Thus, $s_i(t)$ and $n_i(t)$ represent two components of the State Vector. Discounting reduces the impact of old data and allows the inventive algorithm to be more responsive to new data that may reflect changes in the clickthroughs rates or other performance indicators.

The above expressions are specialized for an embodiment in which the performance metrics are based on numbers of "impressions" and "clickthroughs," where for a particular impression the viewer has the binary choice of either clicking-though or not clicking through for each impression.

In the set of equations above, the discounting is provided by the factor β. The above expressions can be easily generalized to an arbitrary or generalized discounting function G{ . . . } which uses the clickthrough impressions from the previous stages to derive the discounted cumulative clicks $s_i(t)$ and the discounted cumulative impressions $n_i(t)$ using the following expressions:

$$s_i(t)=G\{click_i(1), \ldots, click_i(t-2), click_i(t-1)\}, \text{ for } t\geq 2; \text{ and}$$

$$n_i(t)=G\{imp_i(1), \ldots, imp_i(t-2), imp_i(t-1)\}, \text{ for } t\geq 2;$$

where $s_i(1)=0$ and $n_i(1)=0$. In this generalized discounting function G{ . . . }, it is noted that none, some, or all, of the $click_i(t)$ and/or $imp_i(t)$ may actually weighted or discounted, though in the preferred embodiment each is discounted.

In particular functions which give more weight to more recent values of $s_i$ and $n_i$ are of interest. When a different binary response performance indicator than clickthroughs such as positive responses or "successes" are used, and a more general term applied to impressions such as "trials" is used, along with a generalized discounting function H{ . . . }, the general expressions for the total number of discounted successes $s_i(t)$ and the cumulative number of impressions $n_i(t)$ are given by the following expressions:

$$s_i(t)=H\{success_i(1), \ldots, success_i(t-2), success_i(t-1)\}, \text{ for } t\geq 2; \text{ and}$$

$$n_i(t)=H\{trial_i(1), \ldots, trial_i(t-1), trial_i(t-1)\}, \text{ for } t\geq 2.$$

where $s_i(1)=0$ and $n_i(1)=0$.

Thus, $s_i(t)$ and $n_i(t)$ represent the State Vector for banner i. As noted above for G{ . . . }, none, some, or all, of the $success_i(t)$ and/or $trial_i(t)$ may actually weighted or discounted by the discounting function H{ . . . }, though in the preferred embodiment each is discounted.

In some cases, before the inventive system or method are used for optimization, a campaign may already be executing. In this case, information may be available regarding the performance of the banners. This performance information can be used to initialize $s_i(1)$ and $n_i(1)$ as follows. A cumulative or discounting procedure as described in the previous section can be use to estimate $s_i(1)$ and $n_i(1)$ in the same fashion as $s_i(t)$ and $n_i(t)$ are calculated, for example, by either using the cumulative sum or some form of discounting. Those workers having ordinary skill in the art in light of the description provided here will appreciate that there are several similar variations of the above basic strategy.

Even when the campaign is started fresh, a campaign manager may have used the same banner in an earlier campaign or may have a prior judgement about the performance of the banner. In this case the value of $s_i(1)$ and $n_i(1)$ for banner i can be set as follows. The manager can provide an estimate of the average performance of $mean_i$ for the banner i over the previous campaigns. He/she may decide that the information from the previous campaign is worth $N_i$ impressions. In this case $s_i(1)$ can be set to $(mean_i \times N_i)$ and $n_i(1)$ can be set to $N_i$.

The setting of $s_i(1)$ and $n_i(1)$ as described above can be used to incorporate managers prior experience or judgement of the banners. Larger values of $N_i$ imply that the manager is more confident about extrapolating the future performance of the banner based on his prior experience or judgement.

Those workers having ordinary skill in the art in light of the description provided here will appreciate that there are several similar variations of the above basic strategy Allocation Computation Procedure

Having now described several embodiments of the state vector update procedure, attention is now directed to the allocation computation procedure. At the initial stage (when no information has been collected on the banner ads), the inventive procedure may allocate the impressions in any one of several possible manners. Such initial allocation may be based on objective or subjective criteria. In one embodiment, an even or uniform initial allocation of impressions are made from among the available banners. That is, if there are a number b banners, then each banner will receive 1/b of the total number of allocated impressions.

At each of the remaining stages, the inventive procedure uses the available performance data (for example, the record of impressions and clickthroughs from the earlier stages), allocation information, and other information that may be available on the banners to divide the available banners into two classes: (i) a first group referred to as the contenders, and (ii) a second group referred to as the non-contenders. The "contenders" are the banners that are still in contention according to some criteria to be declared the best banner. The "non-contenders" are the banners that appear out of the running for best banner based on the available information. There may also be a (iii) third group of "unavailable banners" if the constraint list indicates that some banners cannot be used on the given zone during a particular stage. Banners that cannot be used for the next stage during which the new allocations are to be made would be placed in the third group, as they cannot be displayed during the next stage independent of how well they might perform. Hence, those ads that are available for the next stage are divided into either the contender or the non-contender group. Any one of these groups may have none, one, or a plurality of ads.

Given this division of the banners into contenders and non-contenders, one embodiment of the inventive procedure allocates the impressions among the banners as follows. Let $\gamma<1$ be a constant that represents the proportion of impressions that will be allocated to the non-contenders at each stage. This $\gamma$ is a constant selected at the beginning of the campaign. The value selected is not critical as the inventive procedure will reallocate between contenders and non-contenders at subsequent stages. The value may also be selected so that impressions are not allocated to non-contenders. Let b represent the total number of banners, $b_1$ denote the number of contenders and $b_2=b-b_1$ the number of non-contenders. Then each contender receives the fraction $(1-\gamma)/b_1$ of the available impressions, while each non-contender receives the fraction $\gamma/b_2$ of the available impressions. Using this approach, most of the impressions are spread evenly among the contenders and a few impressions are used to continue monitoring the non-contenders. As the campaign progresses the number of contenders will generally decrease over time since the inventive system and method will have more information upon which to judge which banners are more successful and which banners are less successful.

In an allocation task where there are five possible banners $\{X_1, X_2, X_3, X_4, X_5\}$, three of which are contenders $\{X_1, X_2, X_3\}$ and two of which are non-contenders $\{X_4, X_5\}$, the Allocation Vector may therefore take the form of (0.3, 0.3, 0.3, 0.05, 0.05) where the contenders each have a 30% proportion and the non-contenders each have a 5% proportion of the total. In a situation where there are six possible banners but one in constrained by the constraint list for a particular stage, that banner would have a zero proportion, for example, allocation vector of the form (0.3, 0.3, 0.3, 0.05, 0.05, 0.0).

Exemplary Pair-Wise Test Procedure to Identify Contenders and Non-Contenders

In one embodiment, the division of banner ads into contenders and non-contenders is based on the following pair-wise test procedure for comparing two banners. When more than two banners are involved in a campaign a pair-wise test is used for each possible pair or combination of banners.

For each pair-wise test, suppose that two banners are given and let $p_i$ (for i=1, 2) denote the unknown clickthrough probability of the $i^{th}$ banner. Let $n_i$ denote the total number of impressions for the $i^{th}$ banner, $s_i$ the total number of successes and $f_i$ the total number of failures. (So, $s_i+f_i=n_i$). Finally, define:

$$Z=(n_2 s_1 - n_1 s_2)/(n_1+n_2), \text{ and}$$

$$V=(n_1 n_2 (s_1+s_2)(f_1+f_2)/(n_1+n_2)^3$$

It can be shown that Z is approximately normally distributed with variance V and mean $\theta V$, where:

$$\theta=\log((p_1(1-p_2))/(p_2(1-p_1))).$$

The pair-wise test attempts to determine or test whether the two unknown clickthrough rates for the two banners under consideration are equal. If they are equal, then $\theta=0$ and Z is normally distributed with mean 0 and variance V. The distance between the observed value of Z and 0 (the mean of its distribution) measured in standard deviations is given by Z divided by the square root of V. If this statistic $(Z/\sqrt{V})$ is greater (in absolute value) than some cutoff threshold value $\alpha$, then the procedure concludes that the click-through (or other performance indicia) rates are significantly different from each other. In one embodiment, the user (such as for example the marketing manager) specifies the cutoff threshold value $\alpha$ prior to the campaign; however, the value may be modified during the campaign. In one embodiment, the value of the cutoff threshold value $\alpha$ is selected to be between about ½ and about 1, based on empirical simulation results, but other values may be used. In one embodiment a cutoff threshold value $\alpha$ of 0.5 is used.

The pair wise test is applied to all pairs of banners. If a particular banner loses one of these comparisons (that is, if a banner is determined to have a significantly lower click-through rate than another banner), then that banner is designated as a non-contender. This pair-wise procedure guarantees that at least one contender will remain.

Exemplary Procedure For More Than Two Sets of Alternatives

The algorithm described above divides the alternatives into two sets: contenders and non-contenders. The basic approach can be extended to decompose the alternatives into more than two sets. Consider the pair-wise test between alternative i and alternative j. Let Compare(i,j) represent the $Z(i,j)/\text{sqrt}(V(i,j))$ statistic where:

$$Z(i,j)=(n_j s_i - n_i s_j)/(n_i+n_j), \text{ and}$$

$$V(i,j)=(n_i n_j (s_i+s_j)(f_i+f_j)/(n_i+n_j)^3.$$

The value of Compare(i,j) is positive if the performance of alternative i is better than alternative j and is negative if the performance of banner j is better than banner alternative i. Define $\text{Perf}(k)=\max_{1 \leq i \leq n} \text{Compare}(i,k)$. The algorithm deems an alternative k to be a non-contender if Perf(k) is above the cutoff threshold, otherwise k is a contender.

The above basic approach can be extended to decompose the alternatives into more than two sets. Under these circumstances, the alternatives are divided into several sets based on the corresponding Perf values. The impressions are allocated to different alternatives such that the alternatives for sets corresponding to higher values of Perf get smaller numbers of impressions. However, the number of impressions allocated to all alternatives within a set is equal. In the extreme case, the number of sets is equal to the number of alternatives. In this case, each alternative gets a different fraction of the total number of impressions (or trials). This approach is formalized in the next section.

Exemplary Procedure for Dividing Alternatives into Multiple Sets

The value of Compare(i,j) is positive if the performance of alternative i is better than alternative j, and the value of Compare(i,j) is negative if the performance of banner j is better than banner alternative i. Define a performance function (Perf(k)) to be the maximum of Compare(i,k) over the range of i from i=1, . . . , n; that is, Perf(k)=$\max_{1 \leq i \leq n}$ Compare(i,k). The algorithm deems an alternative k to be a non-contender if Perf(k) is above the cutoff threshold $\alpha$, otherwise k is deemed to be a contender.

One embodiment uses the value of Perf(k) to segment the banners into two or more sets (r>2 sets). In this context, larger values of the performance function Perf(k) as defined here will generally imply poor relative performance of banner alternative k. Let there be user defined thresholds $\alpha_1$, $\alpha_2$, . . . $\alpha_{(r-1)}$ such that a first threshold $\alpha_0=0$, and the remaining thresholds are each greater than $\alpha_0$, that is $0=\alpha_0<\alpha_1<\alpha_2< . . . <\alpha_{(r-1)}<\alpha_r=\infty$. The algorithm assigns a banner k to set j, where $1 \leq j \leq r$, if $\alpha_{(j-1)} \leq Perf(k) < \alpha_j$.

The impressions are allocated to different alternatives such that the alternatives for sets corresponding to higher values of Perf get smaller fraction of impressions. However, the number of impressions allocated to all alternatives within a set is equal. In the extreme case, the number of sets is equal to the number of alternatives. In this case, each alternative gets a different fraction of the total number of impressions (or more generally, total number of trials).

Those workers having ordinary skill in the art in light of the description provided here will appreciate that there are several similar variations of the above basic strategy that can use the Compare function to segment the banner into multiple sets.

One embodiment of the allocation algorithm is as follows. Define constant $prop_1$, $prop_2$, $prop_3$, . . . , $prop_r$ such that $prop_1 \leq prop_2 \leq prop_3 \leq . . . prop_r$. $Prop_j$ represents the proportion of total impressions assigned to all the banners belonging to set j, where $1 \leq j \leq r$. Let the number of impressions belonging to set j be given by $num_j$, where $1 \leq j = r$. (Note that the Sum of $num_j$=total number of banners). Then banner belonging to set i is assigned the fraction of total banners=$Prop_i / \{\Sigma_{1 \leq j = r}(num_j \times prop_j)\}$.

Unlike the allocation strategy for two sets, the above allocation does not guarantee a fixed fraction of impressions to be allocated to relatively underperforming sets. However, it guarantees that banners belonging to relatively poor performing sets get smaller number of impressions as compared to relatively higher performing sets.

Those workers having ordinary skill in the art in light of the description provided here will appreciate that there are several similar variations of the above basic strategy using the Z and V statistics for the pair-wise comparisons which can be used for decomposing the alternatives into two or more sets.

Procedure For Adding or Deleting Zones or Banners

As mentioned previously, additional operations may be required when zones and/or banners are added or deleted. If a zone is deleted, then the number of available impressions for this zone is set to 0, and no further banners are allocated at this zone (unless the zone is re-introduced later). However, the data collected during earlier stages at this zone can be retained. Recall that in some embodiments, the earlier collected performance data is aged or discounted so that more recent performance data is given greater weight in the computations. If a banner is deleted, then this information is added to the constraint list so that the banner is no longer placed or not placed for a particular zone. Note that a banner may be deleted at one or more zones but remain for placement at other zones. After zones or banners have been deleted, all inputs to the inventive allocation computation procedure (for the remaining zones and banners) are available and allocation for the next stage is determined.

If a zone is added, any constraints that will affect the new zone are specified. If a banner is added, the new state vector is initialized (for example, with an empty history) and any constraints on the banner are specified. In one embodiment, at the next stage, this added banner is treated as though it were as good as the best existing banner, and is allocated the same number of impressions as the best banner (for each zone). However, this can be easily generalized to allocating more (or less) impressions than the best banner. Following this initial stage of data collection for the new banner, the allocation algorithm is applied as usual.

Additional and Alternative Embodiments

It can therefore be seen from the above description that the inventive system and method provide particularly advantageous benefits in the banner ad messaging context. The methodology applied to banner ads is now extended to other messaging situations.

Electronic Mail

Email is an important medium for advertising and marketing. Many businesses now readily use email to acquire new customers, build brands, advertise and promote products, measure consumer satisfaction and manage customer relationships. A typical email campaign involves sending emails to each address on a list of recipients. The list may typically be bought or otherwise acquired from an outside firm or collected internally over a period of time. The procedures and algorithms developed above can be easily extended for optimizing the responses generated by emails. A system and method for improving the performance of Emails is described in U.S. patent application Ser. No. 09/586,394, filed Jun. 2, 2000 and entitled System and Method for Optimizing The Performance of Email and Other Message Campaigns, which is hereby incorporated by reference.

The inventive procedures and algorithms may, for example, be extended to the email environment by decomposing the email process into multiple stages and dividing the measurement process into multiple stages. In each stage a fraction of the total emails to be sent out to each alternative is given by the allocation algorithm described above. The major difference in an email application as compared to the afore described banner ad application is that there is a non-uniform delay between the time an email is sent out and the time a response is received. (For banner ads this delay is either non-existent for practical purposes or fairly uniform, for example the delay for a banner ad clickthrough may be between about 1 second and 60 seconds, well within one stage.) However, one can measure the total number of responses received for a given email alternative by the end of a given stage and the total number of emails sent for that alternative as a way of measuring the performance of a given alternative. This information can then be used by the algorithm to determine and allocate the better alternatives and optimize the total number of responses over the entire campaign. The duration of the stage should advantageously be chosen to ensure that a reasonable fraction of overall responses are received by the end of each stage and the number of stages are large enough that the algorithm can learn the better performing alternatives in the earlier stages and exploit this information in later stages.

Each of the inventive methods, algorithms, and procedures may be implemented as a computer program, also referred to as software or firmware, programs or code, on a general purpose or specialized computer. Such computers routinely include a processor or CPU, a fast random access memory coupled to the processor in which is defined a data structure storing program procedures and data associated with executing the programs or procedures in the processor. Such procedures include the inventive state vector update, pair-wise comparison, and allocation procedures, among other procedures described herein. An operating system is also typically provided. When implemented as a computer program or software or firmware, the invention also includes the program, software, and/or firmware in addition to a computer program product. Such computer program product may tangibly embody the computer program on a machine readable medium such as a magnetic disc, CD-ROM, DVD, memory card, or any other media, or be stored and communicated electronically. For example, the inventive computer program may be communicated electronically or optically over a communication link, such as for example over the Internet.

The foregoing description, for purposes of explanation, used specific nomenclature to provide a thorough understanding of the invention. However, it will be apparent to one skilled in the art in light of the description provided that the specific details are not required in order to practice the invention. Thus, the foregoing descriptions of specific embodiments of the present invention are presented for purposes of illustration and description. They are not intended to be exhaustive or to limit the invention to the precise forms disclosed. Obviously many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents. All patents, publication, or other references referred to herein are hereby incorporated by reference.

We claim:

1. A method for improving the stage-to-stage performance of a message in a multi-stage message campaign in an interactive measurable medium; said method including steps of:
   (a) reading prior stage message state pertaining to a prior stage in a message campaign; said prior stage message state including a cumulative number of trials and a cumulative number of successes for a particular message at the end of said prior stage;
   (b) reading message performance results representing message trials and message successes from said prior stage based on said prior stage message state;
   (c) computing a current message state on the basis of said prior stage message state and said message performance results; and
   (d) generating a current message allocation based on said current message state;
   wherein at least one of steps (a)–(d) is performed by at least one processing device.

2. The method in claim 1, wherein said method further comprising step of:
   (c) storing said current message state as prior stage message state for a next iteration of said method.

3. The method in claim 2, further including repeating steps (a)–(c) for each stage in said message campaign.

4. The method in claim 1, wherein said prior stage message state comprises reading a state vector for the prior stage in a message campaign.

5. The method in claim 1, further comprising the step of storing said initial state vector in a database.

6. The method in claim 1, wherein said step of generating a current message allocation further includes applying a message allocation constraint.

7. The method in claim 1, further including the step of storing said current message allocation in a database.

8. The method in claim 1, wherein said message comprises a web banner ad.

9. The method in claim 1, wherein said message comprises an email.

10. The method in claim 1, wherein said current message state is updated at the end of each state of a message campaign to reflect the performance results of that stage.

11. The method in claim 1, wherein said current message state stores information that has been collected on a given message.

12. The method in claim 1, wherein said message comprises an advertisement, and said current message state stores information that has been collected for said advertisement.

13. The method in claim 1, wherein said message comprises an internet web site banner advertisement and said current message state stores information that has been collected for said banner advertisement at a given zone.

14. The method in claim 1, wherein said message comprises an email message and said current message state stores information that has been collected for said email message.

15. The method in claim 1, wherein said message comprises a banner advertisement and a constraints list stores any constraints on the allocation of banner ads to impressions.

16. The method in claim 1, wherein said step of (b) of reading message performance results further comprises storing said performance results of the most recent stage of the message campaign in a results vector.

17. The method in claim 16, wherein said message comprises an advertisement, and said results vector stores results of a most recent stage of the advertising campaign.

18. The method in claim 1, wherein said step (d) of generating a current message allocation further comprises storing a current message allocation into an allocations vector.

19. The method in claim 18, wherein said allocations vector stores an allocation of banners to available impressions for a future stage in the campaign.

20. The method in claim 18, wherein said allocations vector stores an allocation of messages to available trials for a future stage in the campaign.

21. The method in claim 20, wherein said future stage is a next stage.

22. The method in claim 1, wherein said step (d) of generating a current message allocation uses performance results from all prior stages in the message campaign.

23. The method in claim 1, wherein said step (d) of generating a current message allocation uses performance results form at least one prior stage in the campaign.

24. A method for improving the stage-to-stage performance of a message in a multi-stage message campaign in an interactive measurable medium; said method including steps of:
   (a) reading prior stage message state pertaining to a prior stage in a message campaign; said prior stage message state including a cumulative number of trials and a cumulative number of successes for a particular message at the end of said prior stage;
   (b) reading message performance results representing message trials and message successes from said prior stage based on said prior stage message state;
   (c) computing a current message state on the basis of said prior stage message state and said message performance results; and
   (d) generating a current message allocation based on said current message state;
   wherein said cumulative number of trials and said cumulative number of successes comprise discounted cumulative number of trials and discounted cumulative number of successes;
   wherein at least one of steps (a)–(d) is performed by at least one processing device.

25. A method for improving the stage-to-stage performance of a message in a multi-stage message campaign in an interactive measurable medium; said method including steps of:
   (a) reading prior stage message state pertaining to a prior stage in a message campaign; said prior stage message state including a cumulative number of trials and a cumulative number of successes for a particular message at the end of said prior stage;
   (b) reading message performance results representing message trials and message successes from said prior stage based on said prior stage message state;
   (c) computing a current message state on the basis of said prior stage message state and said message performance results;
   (d) generating a current message allocation based on said current message state;
   (e) storing said current message state as prior stage message state for a next iteration of said method; and
   (f) repeating steps (a)–(e) for each stage in said message campaign;
   wherein said cumulative number of trials and said cumulative number of successes comprise discounted cumulative number of trials and discounted cumulative number of successes;
   wherein said prior stage message state comprises reading a state vector for the prior stage in a message campaign;
   wherein said step of generating a current message allocation further includes applying a message allocation constraint; and
   wherein said message is selected from the group of messages consisting of an advertisement, an email, and combinations thereof;
   wherein at least one of steps (a)–(f) is performed by at least one processing device.

26. A method for improving the stage-to-stage performance of a message in a multi-stage message campaign in an interactive measurable medium, wherein the message comprises a banner advertisement and a constraints list stores any constraints on the allocation of banner ads to impressions; said method including steps of:
   (a) reading prior stage message state pertaining to a prior stage in a message campaign; said prior stage message state including a cumulative number of trials and a cumulative number of successes for a particular message at the end of said prior stage;
   (b) reading message performance results representing message trials and message successes from said prior stage based on said prior stage message state;
   (c) computing a current message state on the basis of said prior stage message state and said message performance results; and
   (d) generating a current message allocation based on said current message state;
   wherein said constraints includes a minimum number of banners to be retained at each state of an ad campaign and the identity of particular banners to be excluded from any zones;
   wherein at least one of steps (a)–(d) is performed by at least one processing device.

27. A method for improving the stage-to-stage performance of a message in a multi-stage message campaign in an interactive measurable medium; said method including steps of:
   (a) reading prior stage message state pertaining to a prior stage in a message campaign; said prior stage message state including a cumulative number of trials and a cumulative number of successes for a particular message at the end of said prior stage;
   (b) reading message performance results representing message trials and message successes from said prior stage based on said prior stage message state;
   (c) computing a current message state on the basis of said prior stage message state and said message performance results; and
   (d) generating a current message allocation based on said current message state using results from a predetermined number of most recent prior stages in the campaign;
   wherein at least one of steps (a)–(d) is performed by at least one processing device.

28. A method for improving the stage-to-stage performance of a message in a multi-stage message campaign in an interactive measurable medium; said method including steps of:
   (a) reading prior stage message state pertaining to a prior stage in a message campaign; said prior stage message state including a cumulative number of trials and a cumulative number of successes for a particular message at the end of said prior stage;
   (b) reading message performance results representing message trials and message successes from said prior stage based on said prior stage message state;
   (c) computing a current message state on the basis of said prior stage message state and said message performance results; and
   (d) generating a current message allocation based on said current message state using weighted results from a predetermined number of the most recent prior stages in the campaign so that more recent results are weighted more heavily than older results;
   wherein at least one of steps (a)–(d) is performed by at least one processing device.

29. A method for improving the stage-to-stage performance of a message in a multi-stage message campaign in an interactive measurable medium; said method including steps of:
   (a) reading prior stage message state pertaining to a prior stage in a message campaign; said prior stage message state including a cumulative number of trials and a cumulative number of successes for a particular message at the end of said prior stage;
(b) reading message performance results representing message trials and message successes from said prior stage based on said prior stage message state;
(c) computing a current message state on the basis of said prior stage message state and said message performance results; and
(d) generating a current message allocation based on said current message state;
wherein, when multiple zones are possible for a message, said step (a)–(d) are applied separately for each zone on a zone-by-zone basis;
wherein at least one of steps (a)–(d) is performed by at least one processing device.

30. A method for improving the stage-to-stage performance of a message in a multi-stage message campaign in an interactive measurable medium; said method including steps of:
(a) reading prior stage message state pertaining to a prior stage in a message campaign; said prior stage message state including a cumulative number of trials and a cumulative number of successes for a particular message at the end of said prior stage;
(b) reading message performance results representing message trials and message successes from said prior stage based on said prior stage message state;
(c) computing a current message state on the basis of said prior stage message state and said message performance results; and
(d) generating a current message allocation based on said current message state;
wherein said performance results are discounted when computing a current state vector;
wherein at least one of steps (a)–(d) is performed by at least one processing device.

31. The method in claim 30, wherein the performance results are discounted using a binary step function where performance data older than a given stage is ignored and performance data newer that the given stage is considered equally.

32. The method in claim 30, wherein the performance results are discounted using a weighting function wherein newer performance data is weighted more heavily than older performance data.

33. The method in claim 30, wherein the performance results are discounted by geometrical discounting where, at each stage, each performance data is discounted according to a geometrical discounting function.

34. A method for improving the stage-to-stage performance of a message in a multi-stage message campaign in an interactive measurable medium; said method including steps of:
(a) reading prior stage message state pertaining to a prior stage in a message campaign; said prior stage message state including a cumulative number of trials and a cumulative number of successes for a particular message at the end of said prior stage;
(b) reading message performance results representing message trials and message successes from said prior stage based on said prior stage message state;
(c) computing a current message state on the basis of said prior stage message state and said message performance results; and
(d) generating a current message allocation based on said current message state;
wherein, at each stage, performance data is discounted according to a geometrical discounting function;
wherein the geometrical discounting function multiplies each performance result at each stage by a number of one-stage discount factors $\beta$, where $\beta$ is less-than-or-equal-to 1 ($\beta \leq 1$), corresponding to the number of stages, such that performance data that is n stages old at the time of execution are multiplied by $\beta$ raised to the n power ($\beta^n$);
wherein at least one of steps (a)–(d) is performed by at least one processing device.

35. The method in claim 34, wherein the one-stage discount factor $\beta < 1$.

36. The method in claim 34, wherein $\beta$ is in a range between about 0 and about 0.99.

37. The method in claim 34, wherein $\beta$ is in a range between about 0.5 and about 1.0.

38. The method in claim 34, wherein $\beta$ is in a range between about 0.8 and about 1.0.

39. The method in claim 34, wherein $\beta$ is in a range between about 0.85 and about 0.95.

40. The method in claim 34, wherein $\beta$ is substantially 0.9.

41. A method for improving the stage-to-stage performance of a message in a multi-stage message campaign in an interactive measurable medium; said method including steps of:
(a) reading prior stage message state pertaining to a prior stage in a message campaign; said prior stage message state including a cumulative number of trials and a cumulative number of successes for a particular ($i^{th}$) message at the end of said prior stage, wherein "i" is between 1 and "n," wherein "n" is a number of messages in the multi-stage message campaign;
(b) reading message performance results representing message trials and message successes from said prior stage based on said prior stage message state;
(c) computing a current message state on the basis of said prior stage message state and said message performance results; and
(d) generating a current message allocation based on said current message state;
wherein said state comprises a state vector having a first state vector component $s_i(t)$ for the total number of discounted cumulative clicks for the particular ($i^{th}$) message at the end of stage t, and a second state vector component $n_i(t)$ for the cumulative number of impressions for the particular ($i^{th}$) message at the end of stage t;
wherein at least one of steps (a)–(d) is performed by at least one processing device.

42. The method in claim 41, wherein:

$$s_i(t) = \beta s_i(t-1) + click_i(t-1), \text{ for } t \geq 2;$$

$$n_i(t) = \beta n_i(t-1) + imp_i(t-1), \text{ for } t \geq 2; \text{ and}$$

$$s_i(1) = 0 \text{ and } n_i(1) = 0; \text{ and}$$

where:
$imp_i(t)$ is the total number of impressions for the particular ($i^{th}$) message in stage t;
$click_i(t)$ represent the total number of clicks for the particular ($i^{th}$) message in stage t; and
$\beta$ is a one stage discounting factor.

43. The method in claim 42, wherein $\beta \leq 1$.

44. The method in claim 41, wherein:

$s_i(t)=G\{click_i(1), \ldots, click_i(t-2), click_i(t-1)\}$, for $t \geq 2$; and $n_i(t)=G\{imp_i(1), \ldots, imp_i(t-2), imp_i(t-1)\}$, for $t \geq 2$;

where $s_i(1)=0$ and $n_i(1)=0$; and where:
- $imp_i(t)$ is the total number of impressions for the particular ($i^{th}$) message in stage t;
- $click_i(t)$ represent the total number of clicks for the particular ($i^{th}$) message in stage t; and
- $G\{\ldots\}$ is a discounting factor.

45. The method in claim 44, wherein $G\{\ldots\}$ is a geometric discounting function.

46. A method for improving the stage-to-stage performance of a message in a multi-stage message campaign in an interactive measurable medium; said method including steps of:
   (a) reading prior stage message state pertaining to a prior stage in a message campaign; said prior stage message state including a cumulative number of trials and a cumulative number of successes for a particular $i^{th}$ message at the end of said prior stage;
   (b) reading message performance results representing message trials and message successes from said prior stage based on said prior stage message state;
   (c) computing a current message state on the basis of said prior stage message state and said message performance results; and
   (d) generating a current message allocation based on said current message state;
   wherein, at each stage, available messages are partitioned into a first group of contending messages that remain in contention to become a best performing message, and a second group that are not in contention to become the best performing message;
   wherein at least one of steps (a)–(d) is performed by at least one processing device.

47. The method in claim 46, wherein said message comprises a banner ad.

48. The method in claim 46, wherein said message comprises an email.

49. The method in claim 46, wherein the available messages are further partitioned into a third group of unavailable messages for messages constrained not to be used on the given zone during a particular stage.

50. The method in claim 49, wherein each of said first group, said second group, and said third group may have none, one, or a plurality of members.

51. The method in claim 46, wherein a first proportion (γ) of total available impressions are allocated to non-contenders at each stage and a second proportion (1−γ) of the total available impressions are allocated to contenders at each stage, at the beginning of a campaign.

52. The method in claim 51, wherein said first proportion (γ) of the total available impressions is between about 0 and about 0.5.

53. The method in claim 51, wherein said first proportion (γ) of the total available impressions is between about 0.01 and about 0.05.

54. The method in claim 51, wherein said first proportion (γ) of the total available impressions is between about 0.02 and about 0.03.

55. The method in claim 46, wherein alternatives for each message are compared on a pair-wise basis to alternatives for each other message to determine a better performing set of pair-wise compared messages.

56. The method in claim 55, wherein the message comprises a banner ad.

57. The message in claim 56, wherein, if a particular banner ad loses a pair-wise comparison by having a lower success rate than another banner ad, the particular banner ad is designated as a non-contender.

58. The method in claim 55, wherein the message comprises an email.

59. The method in claim 58, wherein the email message includes an attachment.

60. The method in claim 55, wherein pair-wise comparison guarantees that at least one contender will remain.

61. The method in claim 55, wherein the pair-wise comparison determines relative success rates for the two message alternatives utilizing a cutoff threshold value.

62. The method in claim 61, wherein said cutoff threshold value is a value between about 0.5 and about 1.0.

63. The method in claim 61, wherein said cutoff threshold value is a value of about ½.

64. A method for improving the stage-to-stage performance of a message in a multi-stage message campaign in an interactive measurable medium; said method including steps of:
   (a) reading prior stage message state pertaining to a prior stage in a message campaign; said prior stage message state including a cumulative number of trials and a cumulative number of successes for a particular $i^{th}$ message at the end of said prior stage;
   (b) reading message performance results representing message trials and message successes from said prior stage based on said prior stage message state;
   (c) computing a current message state on the basis of said prior stage message state and said message performance results; and
   (d) generating a current message allocation based on said current message state;
   wherein said message is selected from the group of messages consisting of an advertisement, an internet web site banner ad, an email, an email advertisement, an email having an advertisement attachment, a solicitation, an interactive television message, and combinations thereof;
   wherein at least one of steps (a)–(d) is performed by at least one processing device.

65. A method for improving the stage-to-stage performance of a message in a multi-stage message campaign in an interactive measurable medium; said method including steps of:
   (a) reading prior stage message state pertaining to a prior stage in a message campaign; said prior stage message state including a cumulative number of trials and a cumulative number of successes for a particular $i^{th}$ message at the end of said prior stage;
   (b) reading message performance results representing message trials and message successes from said prior stage based on said prior stage message state;
   (c) computing a current message state on the basis of said prior stage message state and said message performance results; and
   (d) generating a current message allocation based on said current message state;
   wherein for providing more than two groups of alternatives, the alternatives are divided into multiple sets based on a performance value;

wherein at least one of steps (a)–(d) is performed by at least one processing device.

66. The method in claim 65, wherein a number of impressions allocated to alternatives within a set are equal and the a number of sets is equal to the number of alternatives.

67. A method for improving the stage-to-stage performance of a message in a multi-stage message campaign in an interactive measurable medium; said method including steps of:
   (a) reading prior stage message state pertaining to a prior stage in a message campaign; said prior stage message state including a cumulative number of trials and a cumulative number of successes for a particular ($i^{th}$) message at the end of said prior stage, wherein "i" is between 1 and "n," wherein "n" is a number of messages in the multi-stage message campaign;
   (b) reading message performance results representing message trials and message successes from said prior stage based on said prior stage message state;
   (c) computing a current message state on the basis of said prior stage message state and said message performance results; and
   (d) generating a current message allocation based on said current message state;
   wherein said state comprises a first state vector component $s_i(t)$ for the total number of discounted cumulative successes for the particular ($i^{th}$) message at the end of stage t, and a second state vector component $n_i(t)$ for the cumulative number of trials for the particular ($i^{th}$) message at the end of stage t;
   wherein at least one of steps (a)–(d) is performed by at least one processing device.

68. The method in claim 67, wherein:

$s_i(t) = H\{success_i(1), \ldots, success_i(t-2), success_i(t-1)\}$, for $t \geq 2$; and $n_i(t) = H\{trial_i(1), \ldots, trial_i(t-1), trial_i(t-1)\}$, for $t \geq 2$;

where $s_i(1) = 0$ and $n_i(1) = 0$;

$success_i(t)$ is the number of successful outcomes for the particular ($i^{th}$) message at stage t;
$trial_i(t)$ is the number of trials of the particular ($i^{th}$) message at stage t; and
$H\{\ldots\}$ is a functional operator of the bracketed parameters.

69. The method in claim 68, wherein $H\{\ldots\}$ comprises a weighting function of trials and successes.

70. The method in claim 68, wherein $H\{\ldots\}$ comprises a geometric discounting function wherein newer state data is counted more heavily than older state data.

71. A computer program for use in conjunction with a computer system, the computer program comprising a computer program mechanism embedded therein, the computer program mechanism, comprising:
   a program module that directs the computer system to improving the stage-to-stage performance of a message in a multi-stage message, the program module including instructions for performing a method comprising:
   (a) reading prior stage message state pertaining to a prior stage in a message campaign; said prior stage message state including a cumulative number of trials and a cumulative number of successes for a particular message at the end of said prior stage;
   (b) reading message performance results representing message trials and message successes from said prior stage based on said prior message stage state;
   (c) computing a current message state on the basis of said prior stage message state and said message performance results; and
   (d) generating a current message allocation based on said current message state.

72. The computer program in claim 71, wherein said program module further including instructions for:
   (c) storing said current message state as prior stage message state for a next iteration of said method.

73. The computer program in claim 72, wherein said program module further includes instructions for repeating steps (a)–(c) for each stage in said message campaign.

74. The computer program in claim 71, wherein said prior stage message state comprises reading a state vector for the prior stage in a message campaign.

75. The computer program in claim 71, wherein said step of generating a current message allocation further includes applying a message allocation constraint.

76. The computer program of claim 71, further comprising a tangible computer readable storage medium wherein the computer program is stored on the tangible computer readable storage medium.

77. The computer program of claim 76, wherein said tangible computer readable storage medium is a medium selected from the group consisting of a magnetic storage medium, a solid-state memory device, an optical storage medium, a CD-ROM disk, a DVD disc, a floppy-disc, and combinations thereof.

78. A computer program for use in conjunction with a computer system, the computer program comprising a computer program mechanism embedded therein, the computer program mechanism, comprising:
   a program module that directs the computer system to improving the stage-to-stage performance of a message in a multi-stage message, the program module including tangible instructions for performing a method comprising:
   (a) reading prior stage message state pertaining to a prior stage in a message campaign; said prior stage message state including a cumulative number of trials and a cumulative number of successes for a particular message at the end of said prior stage;
   (b) reading message performance results representing message trials and message successes from said prior stage based on said prior stage message state;
   (c) computing a current message state on the basis of said prior stage message state and said message performance results; and
   (d) generating a current message allocation based on said current message state;
   wherein said cumulative number of trials and said cumulative number of successes comprise discounted cumulative number of trials and discounted cumulative number of successes.

79. A computer program for use in conjunction with a computer system, the computer program comprising a computer program mechanism embedded therein, the computer program mechanism, comprising:
   a program module that directs the computer system to improving the stage-to-stage performance of a message in a multi-stage message, the program module including tangible instructions for performing a method comprising:

(a) reading prior stage message state pertaining to a prior stage in a message campaign; said prior stage message state including a cumulative number of trials and a cumulative number of successes for a particular message at the end of said prior stage;

(b) reading message performance results representing message trials and message successes from said prior stage based on said prior stage message state;

(c) computing a current message state on the basis of said prior stage message state and said message performance results;

(d) generating a current message allocation based on said current message state;

(e) storing said current message state as prior stage message state for a next iteration of said method; and (f) repeating steps (a)–(c) for each stage in said message campaign;

wherein said cumulative number of trials and said cumulative number of successes comprise discounted cumulative number of trials and discounted cumulative number of successes;

wherein said prior stage message state comprises reading a state vector for the prior stage in a message campaign;

wherein said step of generating a current message allocation further includes applying a message allocation constraint; and wherein said message selected from the group of messages consisting of an advertisement, an email, and combinations thereof.

80. A computer system comprising:

a server having a processor and a memory coupled to said processor;

an internet interface means for coupling said processor to the internet;

means for receiving performance results from a message service coupled to said internet;

means for transmitting a message allocation to said message service;

a message optimization procedure implemented as a computer program and comprising a computer program mechanism embedded therein and stored in said memory and executing in said processor;

said computer program mechanism, comprising a program module that directs the computer system to improving the stage-to-stage performance of a message in a multi-stage message, the program module including tangible instructions for performing a method comprising:

(a) reading prior stage message state pertaining to a prior stage in a message campaign; said prior stage message state including a cumulative number of trials and a cumulative number of successes for a particular message at the end of said prior stage;

(b) reading message performance results representing message trials and message successes from said prior stage based on said prior stage message state;

(c) computing a current message state on the basis of said prior stage message state and said message performance results; and (d) generating a current message allocation based on said current message state.

* * * * *